United States Patent [19]

Yamaguchi et al.

[11] Patent Number: 4,838,946
[45] Date of Patent: Jun. 13, 1989

[54] ABSORBENT OF CHLOROSILANE COMPOUND

[75] Inventors: Hisayoshi Yamaguchi, Tokyo; Tamotsu Yanagisawa; Minoru Kobayashi, both of Niigata, all of Japan

[73] Assignee: Shin-Etsu Handotai Co., Ltd., Tokyo, Japan

[21] Appl. No.: 198,483

[22] Filed: May 25, 1988

[51] Int. Cl.$^4$ .......................... C07C 7/13; C07C 7/135; B08B 7/00
[52] U.S. Cl. .......................................... 134/7; 134/42; 585/823
[58] Field of Search ....................... 585/823; 134/7, 42

[56] References Cited

U.S. PATENT DOCUMENTS 3,862,900  1/1975  Reusser .................................. 585/823
4,492,001  1/1985  Hedrenius ............................. 134/7

FOREIGN PATENT DOCUMENTS 0131923  8/1983  Japan ..................................... 585/823
1362331  8/1974  United Kingdom .

Primary Examiner—Asok Pal
Attorney, Agent, or Firm—Jules E. Goldberg

[57] ABSTRACT

When a liquid chlorosilane compound inadvertently runs out of a container, the liquid must be disposed by absorbing using an absorbent since chlorosilane compounds are generally very dangerous and toxic. Instead of dry sand conventionally used as an absorbent in such a purpose, the invention purposes that a very efficient effect of absorption can be obtained by using a silica-, silica/alumina-based porous ceramic material or a mixture of them as an absorbent without gas evolution in the liquid and with little temperature increase of the liquid when the absorbent material has a specified content of silica or silica/alumina and a pore diameter distribution.

1 Claim, No Drawings

ABSORBENT OF CHLOROSILANE COMPOUND

BACKGROUND OF THE INVENTION

The present invention relates to an absorbent of chlorosilane compounds or, more particularly, to an absorbent material having a capacity of absorbing a large volume of chlorosilane compounds without the problem of producing toxic gases by the reaction with the chlorosilane compound.

As a class of important starting materials, consumption of chlorosilane compounds is rapidly increasing year by year in various industries for the production of silicones, semiconductor silicon, synthetic quartz glass and the like. Chlorosilane compounds in general, however, are chemically very unstable and must be handled with utmost care in order to prevent hazardous troubles. When a chlorosilane compound is exposed to atmospheric air by being leaked out of a tightly stoppered container in which the compound is stored, for example, the chlorosilane compound is readily reacted with the moisture in the atmospheric air and rapidly hydrolyzed to produce toxic and corrosive hydrogen chloride gas and, sometimes, inflammable and explosive hydrogen gas. In addition, chlorosilane compounds per se generally have a low flash point and are very inflammable so that handling of chlorosilane compounds is always accompanied by a danger of fire and explosion and, once a chlorosilane compound has caught fire, the fire can be extinguished only with great difficulties. In this regard, it is important for safety that a chlorosilane compound running out of a container is immediately obsorbed in an absorbent material in order to be prevented from spreading.

The most conventional and traditional absorbent material used in the prior art for the above mentioned purpose of absorption is dry sand which, however, is not free from the disadvantages that the amount of the chlorosilane compound which can be absorbed by a unit weight of dry sand is relatively small and that impurities contained in natural sand may sometimes react with the chlorosilane compound to produce toxic gases.

SUMMARY OF THE INVENTION

Accordingly, the inventors have conducted extensive investigations to develop an efficient method for absorbing a chlorosilane compound eventually running out of a container by use of an absorbent material and arrived at a discovery that the most efficient absorbent material for absorbing a chlorosilane compound is a silica-or silica/alumina-based porous ceramic material.

Thus, the absorbent material of a chlorosilane compound provided by the invention is a silica- or silica/alumina-based porous ceramic material or a mixture of them, powdery or granular, and the method of the present invention for absorbing a chlorosilane compound with an absorbent material comprises contacting the chlorosilane compound with a silica- or silica/alumina-based porous ceramic material or a mixture of them. The above mentioned silica-based porous material should contain at least 80% by weight of silicon dioxide $SiO_2$. When the absorbent material is a silica/alumina-based porous material, the total content of silicon dioxide $SiO_2$ and aluminum oxide $Al_2O_3$ should be at least 90% by weight. Further, the porous material should have pores having pore diameters in the range from 0.1 to 100 $\mu$m.

It is further preferable that the porous powdery or granular absorbent material of the invention has a surface rendered hydrophobic by a treatment with an organosilane compound or an organopolysiloxane compound.

DETAILED DESCRIPTION OF THE PREFERRED EMBODIMENTS

The chlorosilane compound implied in the present invention includes methyl chlorosilanes and phenyl chlorosilanes used in large quantities in recent years as a starting material in the manufacture of silicones, high-purity semiconductor silicon, synthetic quartz glass and the like and is represented by the general formula $R_aSiH_bCl_c$, in which R is a methyl group or phenyl group, the subscripts a and b are each zero, 1, 2 or 3 and the subscript c is a positive integer not exceeding 4 with the proviso that $a+b+c=4$. Examples of typical chlorosilane compounds include trichlorosilane, silicon tetrachloride, trimethyl chlorosilane, methyl dichlorosilane, dimethyl dichlorosilane, methyl trichlorosilane, phenyl trichlorosilane, diphenyl dichlorosilane and the like. These chlorosilane compounds are each a very unstable compound and, when exposed to atmospheric air, rapidly hydrolyzed by reacting with the moisture contained in the atmospheric air to produce toxic and corrosive hydrogen chloride gas. Excepting for silicon tetrachloride, moreover, they are all inflammable and, once fire is set thereon, it is extremely difficult to rapidly extinquish the fire.

The absorbent material of chlorosilane compounds according to the invention is a silica- or silica/alumina-based porous ceramic material or a mixture of them, powdery or granular, of which the pores have a pore diameter in the range from 0.1 to 100 $\mu$m, the content of silicon dioxide $SiO_2$ in the silica-based material being at least 80% by weight and the total content of silicon dioxide $SiO_2$ and aluminum oxide $Al_2O_3$ in the silica/alumina-based material being at least 90% by weight. These porous materials can be obtained by subjecting a naturally occurring material having a high purity to a treatment with an acid, drying and calcination. Major impurities contained in such a naturally occurring material include iron oxide $Fe_2O_3$, calcium oxide, CaO, magnesium oxide MgO, potassium oxide $K_2O$, sodium silicate $xNa_2O.ySiO_2$ and the like, of which the contents of alkali and alkaline earth impurities such as calcium oxide, magnesium oxide, potassium oxide and the like should be as small as possible because these impurities may directly react with the chlorosilane compound to produce toxic gases, e.g., hydrogen chloride, and inflammable gases, e.g., hydrogen. It is of course that the absorbent material should be as dry as possible since moisture contained therein causes hydrolysis of the chlorosilane compound.

One of the suitable silica-based materials to meet the above described requirements is a natural amorphous silica sand as a kind of geyserite or siliceous sinter occurring in Japan and sold under a tradename of Silton 3S which should be calcined and purified prior to use as an absorbent. The powdery silica-based material thus obtained typically contains 89.1% by weight of silicon dioxide and a porosity of 70% with a true density of 2.3 g/cm$^3$. When a silica/alumina-based porous powdery material is desired, the above mentioned Silton 3S is uniformly blended with kaolin together with water and the blend is dried, calcined, pulverized and finally classified relative to the particle size using a sieve. The thus prepared porous silica/alumina-based powdery material typically contains 68% by weight of silicon dioxide and 23% by weight of aluminum oxide and has a porosity of 80%.

It is preferable that the above mentioned porous powdery or granular ceramic material has a surface rendered hydrophobic by a treatment with an organosilane compound or an organopolysiloxane compound.

When a chlorosilane compound inadvertently runs out of a container and is spread over the ground or floor of a plant in which the compound is under handling, the absorbent material of the invention is sprinkled in a sufficiently large amount on the pool of the chlorosilane compound on the ground or floor so that the liquid chlorosilane compound is absorbed into the numberless pores of the absorbent material and prevented from vaporization and contacting with the atmospheric air without reacting with the absorbent material. Therefore, not only vaporization of the chlorosilane compounds per se but also formation of toxic gases such as hydrogen chloride and inflammable gases such as hydrogen can efficiently be prevented thereby. It is of course that the danger of fire or explosion can be minimized in this manner even when the chlorosilane compound is highly inflammable. The above described advantages can be fully exhibited only when the pore diameter of the porous absorbent material is within the above mentioned range. Otherwise, it is unavoidable that a considerably large quantity of heat is evolved by way of the adsorption, which predominantly occurs for the pore diameter less than 0.1 $\mu$m across, of a chlorosilane compound in the porous adsorbent material. There are usually known silica gel and alumina gel are excellent adsorbents being 0.001 $\mu$m to 0.1 $\mu$m in the pore diameter.

Silica gel of the pore diameter of 0.001 $\mu$m to 0.05 $\mu$m added to a liquid trichlorosilane, the adsorption heat is so great that the temperature rapidly increase to the extent that the liquid eventually comes to boil up, vaporize and as a result cannot be confined from the ambient air through the strong adsorption effect.

In this regard, the absorbent material of the invention can be used for the purpose of fire extinguishment by sprinkling it over a chlorosilane compound in burning by the absorbing effect thereof along with sprinkling of other fire-extinguishment agents such as water and highly halogenated hydrocarbon compounds.

In the following, examples are given to illustrate the present invention in more detail.

EXAMPLE 1

Trichlorosilane in a volume of 50 ml was taken in a glass beaker of 150 ml capacity and 43 g of a porous silica/alumina-based ceramic material were added thereto by using a spoon as an absorbent material at an ambient temperature of 19° C. The absorbent material contained 68% by weight of silicon dioxide and 25% by weight of aluminum oxide and had a particle size distribution ranging from 10 to 500 $\mu$m with a pore diameter ranging from 0.1 to 50 $\mu$m. It was noted in this test that the volume of gas evolution was very small and the temperature of the liquid trichlorosilane was only slightly increased from 19° C. to 20° C. by the addition of the absorbent.

For comparison, the same test as above was repeated except that 43 g of the silica/alumina-based porous ceramic absorbent were replaced with 154 g of dry sand. In this case, a considerably large volume of gas evolution was noted with gas bubbles rising in the liquid. The temperature of the liquid was increased from 19° C. to 30° C.

The above described comparative tests show that the porous ceramic absorbent according to the invention is much more effective as an absorbent of trichloroislane than conventional dry sands even when the amount of the absorbent used is only one-third or smaller than that of the dry sand with a smaller volume of gas evolution during addition.

EXAMPLE 2

Trichlorosilane in a volume of 500 ml was taken in a steelmade vessel of 2500 ml capapcity and 190 g of a porous silica/alumina-based ceramic absorbent material were sprinkled thereover by using a small scoop at an ambient temperature of 7.5° C. The absorbent material contained 85% by weight of silicon dioxide and 12% by weight of aluminum oxide and had a particle size distribution ranging from 10 to 1000 $\mu$m with a pore diameter ranging from 0.1 to 100 $\mu$m. It was noted that no reaction took place at all with the temperature of the trichlorosilane unchanged at 8° C.

For comparison, the same test as above was repeated except that 190 g of the porous ceramic absorbent material were replaced with 2900 g of dry sand. It was noted in this case that a reaction took place to some extent in the trichlorosilane with bubbles rising in the liquid. The temperature of the trichlorosilane was increased by the addition of the sand from 8° C. to 17° C.

As is understood from the above given comparative tests, the porous ceramic absorbent material of the invention is more effective than dry sand even when the amount thereof is only one-fifteenth of dry sand is free from the problem of temperature elevation of the chlorosilane compound due to the reaction of the silane with the absorbent material or rather with the impurities contained in the absorbent material.

Suppose that the above described results are also held in an industrial accident in which 500 liters at 20° C. or 670 kg of trichlorosilane have run out of a reservoir tank, 190 kg of the porous ceramic material according to the invention are sufficient to absorb the whole volume of the chlorosilane compound while the same absorbing effect can be obtained by using dry sand only when the amount of the dry sand is as large as 2900 kg or larger.

EXAMPLE 3

Absorption tests of various chlorosilane compounds other than trichlorosilane were undertaken by adding either the same porous ceramic absorbent as used in Example 1 according to the invention (Test A) or dry sand (Test B) in amounts indicated below to 50 ml of the chlorosilane compound contained in a vessel of stainless steel at an ambient temperature of 29° to 30° C. The results of the tests were as described below.

(a) Trimethyl chlorosilane

Test A (35 g absorbent):
No gas evolution; liquid temperature from 28° C. to 29° C.
Test B (280 g absorbent):
Medium volume of gas evolution, bubbles rising in the liquid; liquid temperature from 28° C. to 36° C.

(b) Methyl dichlorosilane

Test A (35 g absorbent):

No gas evolution; liquid temperature from 28° C. to 29° C.

Test B (210 g absorbent):
Large volume of gas evolution; bubbles rising in the liquid; liquid temperature from 28° C. to 31° C.

(c) Dimethyl dichlorosilane

Test A (40 g absorbent):
No gas evolution; liquid temperature from 28° C. to 30° C.

Test B (270 g absorbent):
Medium volume of gas evolution; bubbles rising in the liquid; liquid temperature from 28° C. to 41° C.

(d) Methyl trichlorosilane

Test A (40 g absorbent):
No gas evolution; liquid temperature from 28° C. to 30° C.

Test B (285 g absorbent):
Medium volume of gas evolution; bubbles rising in the liquid; liquid temperature from 28° C. to 41° C.

(e) Phenyl trichlorosilane

Test A (45 g absorbent):
No gas evolution; liquid temperature from 28° C. to 32° C.

Test B (370 g absorbent):
Small volume of gas evolution; liquid temperature from 28° C. to 34° C.

(f) Diphenyl dichlorosilane

Test A (55 g absorbent):
No gas evolution; liquid temperature from 28° C. to 34° C.

Test B (350 g absorbent):
Small volume of gas evolution; liquid temperature from 28° C. to 42° C.

(g) Silicon tetrachloride

Test A (35 g absorbent):
No gas evolution; liquid temperature from 26° C. to 28° C.

Test B (215 g absorbent):
Medium volume of gas evolution; bubbles rising in the liquid; liquid temperature from 28° C. to 42° C.

As is understood from the results shown above, dry sand as a conventional absorbent of chlorosilane compounds is disadvantageous because gas evolution takes places more or less by the addition thereof to a chlorosilane compound sometimes accompanied by a large volume of bubbles rising in the liquid bringing the liquid to a seemingly boiling condition along with a large increase of the liquid temperature.

In contrast thereto, the porous ceramic material used as the absorbent according to the invention is much more advantageous in safety than the conventional absorbent materials because the effect of absorption can be fully obtained even when the added amount thereof is only one-sixth or smaller of that of the dry sand absolutely without gas evolution or bubbles in the liquid when the absorbent is added to a chlorosilane compound and also with a relatively small increase of the liquid temperature.

Thus, the present invention provides a very efficient and advantageous means to absorb a chlorosilane compound running out of a container without evolution of a toxic gas by the reaction with the chlorosilane compound so that the invention is industrially useful even by setting aside the economical advantage because a volume of a chlorosilane compound can be fully absorbed with a relatively small amount of the absorbent.

What is claimed is:

1. In a method for absorbing a liquid chlorosilane compound by use of an absorbent material contacted with the chlorosilane compound, an improvement which comprises using, as the absorbent, a silica-, silica/alumina-based porous ceramic material or a mixture of them of which the pores have a pore diameter in the range from 0.1 to 100 $\mu$m, the content of silicon dioxide $SiO_2$ in the silica-based material being at least 80% by weight and the total content of silicon dioxide $SiO_2$ and aluminum oxide $Al_2O_3$ in the silica/alumina-based material being at least 90% by weight.

* * * * *